(12) United States Patent
Tichy et al.

(10) Patent No.: US 12,397,624 B2
(45) Date of Patent: Aug. 26, 2025

(54) METAL RIB OVERMOLDING JOINING

(71) Applicants: Magna Exteriors Inc., Concord (CA); Stanislav Tichy, Troy, MI (US)

(72) Inventors: Stanislav Tichy, Troy, MI (US); Riad Chaaya, Clarkston, MI (US); Mark P. Birka, Northville, MI (US); Christopher J. Kuntze, Goodrich, MI (US); Heiner Salzmann, Metamora, MI (US)

(73) Assignee: Magna Exteriors Inc., Aurora (CA)

( * ) Notice: Subject to any disclaimer, the term of this patent is extended or adjusted under 35 U.S.C. 154(b) by 52 days.

(21) Appl. No.: 17/620,241

(22) PCT Filed: Jun. 19, 2020

(86) PCT No.: PCT/US2020/038777
§ 371 (c)(1),
(2) Date: Dec. 17, 2021

(87) PCT Pub. No.: WO2020/257673
PCT Pub. Date: Dec. 24, 2020

(65) Prior Publication Data
US 2022/0339994 A1    Oct. 27, 2022

Related U.S. Application Data

(60) Provisional application No. 62/864,878, filed on Jun. 21, 2019, provisional application No. 62/864,691, (Continued)

(51) Int. Cl.
*B60J 5/10* (2006.01)
*B29C 45/14* (2006.01)
(Continued)

(52) U.S. Cl.
CPC ......... *B60J 5/107* (2013.01); *B29C 45/14336* (2013.01); *B29C 45/14631* (2013.01);
(Continued)

(58) Field of Classification Search
CPC ............ B29L 2031/3002; B60J 5/0484; B29C 45/14; B62D 29/004
See application file for complete search history.

(56) References Cited

U.S. PATENT DOCUMENTS 5,538,094 A * 7/1996 Cobes, Jr. ............ B62D 29/004
296/76
5,842,265 A * 12/1998 Rink ................. B29C 45/14221
428/140
(Continued)

FOREIGN PATENT DOCUMENTS

CN    108602282 A    9/2018
DE    2750982 A1    5/1979
(Continued)

OTHER PUBLICATIONS

EP-3186134-B1 machine translation (Year: 2018).*
(Continued)

*Primary Examiner* — Michael W Hotchkiss
(74) *Attorney, Agent, or Firm* — Warn Partners, P.C.

(57) ABSTRACT

Metal rib overmolding joining including creating geometrical features in reinforcements for interconnecting a three-dimensional metal reinforcement to a metal base plate of an overmolding part in order to transfer load forces. Interlocked reinforcement is pre-assembled or assembled in an injection molding tool. Geometric features are positioned and joined creating a connection geometry that is overmolded. The joints created between the metal reinforcements are done without a welding process.

25 Claims, 7 Drawing Sheets

Related U.S. Application Data filed on Jun. 21, 2019, provisional application No. 62/864,685, filed on Jun. 21, 2019, provisional application No. 62/864,785, filed on Jun. 21, 2019, provisional application No. 62/864,981, filed on Jun. 21, 2019.

(51) Int. Cl.
  *B29C 45/44* (2006.01)
  *B29K 705/00* (2006.01)
  *B29L 31/30* (2006.01)

(52) U.S. Cl.
  CPC .... *B29C 45/44* (2013.01); *B29C 2045/14327* (2013.01); *B29C 2045/445* (2013.01); *B29K 2705/00* (2013.01); *B29L 2031/3014* (2013.01); *E05Y 2201/636* (2013.01); *E05Y 2600/626* (2013.01); *E05Y 2900/546* (2013.01)

(56) References Cited

U.S. PATENT DOCUMENTS

| | | | | |
|---|---|---|---|---|
| 6,079,180 A * | 6/2000 | Wycech | | B62D 29/002 296/187.02 |
| 6,421,979 B1 * | 7/2002 | Fischer | | B29C 65/567 52/836 |
| 6,503,585 B1 * | 1/2003 | Wagenblast | | B62D 29/001 108/51.11 |
| 6,761,187 B1 * | 7/2004 | Zoellner | | B29C 66/131 285/21.2 |
| 6,892,993 B2 * | 5/2005 | Palmer | | A47B 96/021 248/346.02 |
| 7,025,921 B2 * | 4/2006 | Ilse | | B62D 29/004 264/279.1 |
| 8,403,399 B2 * | 3/2013 | Kuntze | | B60J 5/107 296/205 |
| 8,747,988 B2 * | 6/2014 | Brambrink | | B60J 7/04 428/119 |
| 8,894,128 B2 * | 11/2014 | Barral | | B62D 29/005 49/501 |
| 10,589,605 B2 * | 3/2020 | Imbert | | E05B 79/04 |
| 10,723,209 B2 * | 7/2020 | Chiba | | B60J 5/107 |
| 2001/0053431 A1 * | 12/2001 | Goldbach | | B62D 29/004 428/138 |
| 2003/0152745 A1 * | 8/2003 | Wagenblast | | B29C 66/52451 428/122 |
| 2004/0105949 A1 * | 6/2004 | Krause | | B29C 45/14467 428/57 |
| 2004/0232591 A1 * | 11/2004 | Dajek | | B62D 29/001 264/274 |
| 2004/0258880 A1 * | 12/2004 | Bauhof | | B32B 3/06 428/119 |
| 2005/0140173 A1 * | 6/2005 | Riviere | | B62D 29/004 296/187.01 |
| 2006/0121246 A1 * | 6/2006 | Staargaard | | B29C 45/14344 428/139 |
| 2007/0182180 A1 * | 8/2007 | Eipper | | B29C 45/14467 296/2 |
| 2010/0259071 A1 * | 10/2010 | Enns | | B62D 25/06 296/203.01 |
| 2011/0061302 A1 * | 3/2011 | Barral | | B62D 25/12 49/70 |
| 2011/0133517 A1 * | 6/2011 | Leanza | | B62D 27/02 296/203.01 |
| 2012/0219748 A1 * | 8/2012 | Gillard | | B60J 5/107 296/39.1 |
| 2013/0069392 A1 * | 3/2013 | Hall | | B62D 27/02 296/29 |
| 2013/0193713 A1 * | 8/2013 | Reese | | B29C 45/1418 264/261 |
| 2016/0193763 A1 * | 7/2016 | Egerer | | B29C 45/14508 428/61 |
| 2016/0207234 A1 * | 7/2016 | Krahnert | | B32B 15/08 |
| 2016/0271926 A1 * | 9/2016 | Lo | | B62D 27/00 |
| 2017/0210187 A1 * | 7/2017 | Meyer | | B29C 70/48 |
| 2017/0327157 A1 * | 11/2017 | Jaunasse | | B29C 70/085 |
| 2018/0001933 A1 * | 1/2018 | Piermarioli | | B62D 25/08 |
| 2018/0290523 A1 * | 10/2018 | Imbert | | B60J 5/0433 |

FOREIGN PATENT DOCUMENTS

| | | | | |
|---|---|---|---|---|
| DE | 10104035 A1 * | 8/2002 | ....... | B29C 45/14467 |
| DE | 102016011304 A1 | 3/2018 | | |
| DE | 102015014357 B4 * | 12/2019 | ........... | B62D 27/023 |
| EP | 1724185 A1 * | 11/2006 | ....... | B29C 45/14311 |
| EP | 1927453 B1 * | 1/2012 | ....... | B29C 45/14631 |
| EP | 2233386 B1 * | 4/2014 | ............. | B62D 27/02 |
| EP | 3186134 B1 * | 9/2018 | ....... | B29C 45/14467 |
| FR | 2876340 A1 * | 4/2006 | ........... | B62D 25/084 |
| GB | 1468190 A * | 3/1977 | ........... | E04B 1/2403 |
| GB | 2119889 A * | 11/1983 | ........... | E04B 1/2403 |
| WO | WO2001038063 A1 * | 5/2001 | ............. | B32B 15/00 |
| WO | 2016030591 A1 | 3/2016 | | |

OTHER PUBLICATIONS

DE-102015014357-B4 machine translation (Year: 2019).*
EP-1724185-A1 machine translation (Year: 2006).*
EP1927453B1 translation (Year: 2012).*
DE-10104035-A1 translation (Year: 2002).*
WO2001038063A1 translation (Year: 2001).*
FR-2876340-A1 machine translation (Year: 2006).*
International Search Report for PCTUS2020038777 dated Oct. 7, 2020, 2-pages.
Search Report for Chinese Application No. 202080059134.4 dated Sep. 25, 2023, 2-pages.

* cited by examiner

METAL RIB OVERMOLDING JOINING

CROSS-REFERENCE TO RELATED APPLICATIONS

This application is a National Stage of PCT International Application No. PCT/US2020/038777, filed Jun. 19, 2020 and claims the benefit of U.S. Provisional Patent Application No. 62/864,685, filed Jun. 21, 2019, U.S. Provisional Patent Application No. 62/864,691, filed Jun. 21, 2019, U.S. Provisional Patent Application No. 62/864,785, filed Jun. 21, 2019, U.S. Provisional Patent Application No. 62/864,878, filed Jun. 21, 2019 and U.S. Provisional Patent Application No. 62/864,981, filed Jun. 21, 2019. The disclosures of the above applications are incorporated herein by reference.

FIELD OF THE INVENTION

The present invention relates to strengthening rib overmolding joining technologies.

BACKGROUND OF THE INVENTION

Large panels, such as, but not limited to, liftgate panels for vehicles, generally require reinforcement in areas to meet structural performance and standards. A conventional reinforcement is a metal bracket. Standard flat metal bracket overmolding does not fulfill the customer requirements regarding structural performance. In addition, flat metal to flat metal bracket (flat-to-flat) has creep and lower stiffness. Stamping steel or other metal is also prone to waste of material, e.g., such as for flat-to-flat before further processing, and it is heavier, and requires thicker pieces of metal. Known hollow tubes for stiffening, e.g., metal tube, collapse during processing. Furthermore, welding metal plates, such as flat metal plates, is expensive Steel, aluminum and magnesium castings fulfill the same performance requirements, but are much more expensive, higher weight, or have to be installed with secondary operations. Conventional liftgate panels, for example, are large and made of steel, aluminum and magnesium castings that are expensive, higher weight, and have to be installed with secondary operations.

Accordingly, there is a need for a three dimensional structure with overmolding that gives significant performance benefits, including, load transfer by overmolding the connection, and method for manufacturing same that creates joints between metal parts without a welding process is a significant benefit.

SUMMARY OF THE INVENTION

Three dimensional metal ribs need to be connected to a metal base plate of overmolding part in order to transfer load, which would require welding. However, aspects of the present invention utilize the molding process to connect and position the ribs to the base metal plate. Creating geometrical features in the base plate and the rib accommodate the above joining. Assembly and joining is happening before the overmolding or is happening in the injection tool.

The present invention provides structural benefits to large panels due to geometrical features in the base plate and at least one rib in combination with the benefit of the overmolding process. Utilize the molding process to connect and position the ribs to the base metal plate. Create geometrical features in the base plate and the rib to accommodate the above. Assembly and joining is happening before the overmolding or is happening in the injection tool. Creating joints between metal parts without a welding process is a significant benefit. Load transfer by overmolding connection.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
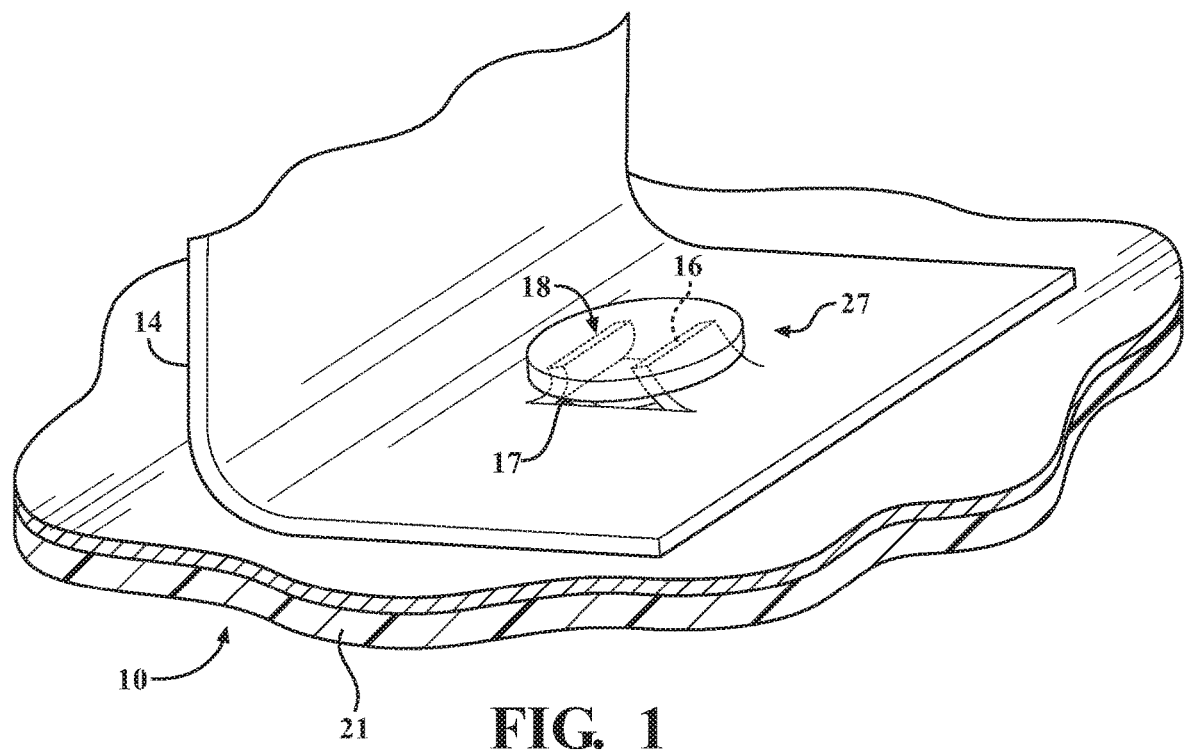
FIG. 1 is a perspective view of a joint formed by interlocking metal parts with an overmold, in accordance with the present invention.

The following description of the preferred embodiment(s) is merely exemplary in nature and is in no way intended to limit the invention, its application, or uses.

Referring to FIGS. 1-13 generally, there is provided a three dimensional (3D) reinforcement shape in combination with the benefit of an overmolding process that at least partially overmolds said reinforcement. The alignment, assembly and joining of the 3D reinforcement is done either before the overmolding or in the injection tool. The present invention meets predetermined requirements such as strength standards. A predetermined geometry is provided by the reinforcement adapted to be overmolded. Typically, there is provided at least one 3D dimensioned reinforcement, e.g., rib, that is operably connected to at least one second reinforcement, e.g., plate. Preferably, a first reinforcement is operably connected to a panel and a second reinforcement is operably connected to the first reinforcement. More preferably, there is provided at least one plate that is operably connected to a panel or other component and at least one rib that is operably connected to the plate. Most preferably a metal plate is operably connected to a large panel, e.g., inner panel of a liftgate in a hinge area or any other predetermined area of the panel, and a metal rib is operably connected to the plate creating an interlocked 3D geometry, which can be overmolded. While a metal plate is described, it is understood that the first and second reinforcements can be any predetermined profile and reinforcement material depending on the particular application without departure from the scope of the present invention.

The interlocked 3D reinforcement is pre-assembled by a predetermined step (e.g., slotted together, mechanical lock, through hole, etc and any combinations) or assembled in the injection tool.

According to an aspect of the present invention, a metal bracket reinforcement is fully overmolded on one or both sides of the panel. According to another aspect of the present invention, a metal bracket reinforcement is at least partially covered on one or both sides of the panel. According to another aspect of the present invention, a metal bracket reinforcement is only partially visible from the B-side of the panel (e.g., open at rib nuts, or more open to leave room for functional openings, etc). According to another aspect of the present invention, a metal bracket reinforcement is only partially visible from the B-side of the panel (e.g., open at rib nuts, or more open to leave room for functional openings, etc) so that it is not fully overmolded or covered on that one side, and is fully open or substantially open on the other side of the panel. Preferably, when overmolded to be fully covered, it is a show quality surface or Class-A surface with no read through issues.

According to an aspect of the present invention plastic flows between a first reinforcement and second reinforcement (e.g., 3D stamping reinforcement, 3D reinforcement channel, etc) in predetermined locations, e.g., such as between a raised rib that has a channel). At least one aperture, e.g., bleeder hole, is provided, e.g., through backside of the second reinforcement, for delivery of plastic to predetermined locations. According to an aspect of the present invention, the plastic is on top of the 3D structure (e.g., on top of the 3D structure in addition to within the raised rib channel within the 3D structure). Any of the aforementioned aspects are contemplated in combination depending on the application without departure from the scope of the present invention.

The 3D geometry of the present invention has significant advantages over flat plates, and the present invention has significant advantages over welding. One advantage is that the interlocking 3D geometry prevents parts from sliding over each other to break the welds.

The reinforcements of the present invention are preferably metal, e.g., steel, aluminum, the same metal, or different metals, etc.

Welding at least one metal rib on an existing metal bracket would have disadvantages. A full line of welding on a complex geometry is difficult, time consuming and expensive, and spot welding is not strong enough. Thus, referring to the figures generally, according to aspects of the present invention, provide a new metal rib in accordance with the present invention and make the connection with a plastic material. Another advantage is that pre-assembly costs of material can be eliminated or greatly reduced. In addition, by having no straight surface to surface (e.g. flat surface to flat surface interface), instead the present invention creates a flange or other suitable profile for connection, there is realized significant benefits in strength.

Referring to the figures generally, there is depicted various exemplary flange options. It is understood that any alternative suitable flange/rib/profile and combinations suitable for interlocking features depending on the particular application are contemplated without departure from the scope of the present invention.

Figure 2:
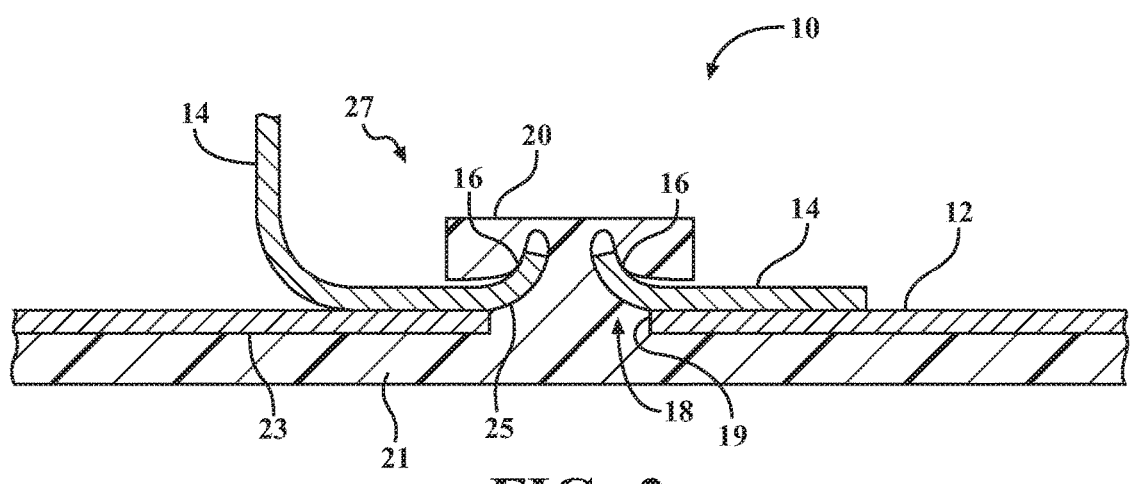
FIG. 2 is a cross sectional view of the metal rib overmolding, according to aspects of the present invention.

Referring more particularly to FIGS. 1-2, there is depicted a metal overmolding joint shown generally at 10 including at least one reinforcement 12, and including at least one 3D reinforcement 14 including at least one geometric feature 16 (e.g., at least two ribs 16, opposing ribs, etc). The at least one 3D reinforcement is typically a bracket, e.g., L-bracket or any other predetermined suitable shape, including the at least one geometric feature 16 adjacent an aperture 17 formed in the 3D reinforcement 14. FIGS. 1-2 depict two exemplary ribs that are identical and located at opposite sides of the aperture 17. Another aperture 19 is formed in the at least one reinforcement 12. When the at least one reinforcement 12 and the at least one 3D reinforcement 14 are then positioned relative to each other for creating the desired joint indicated generally at 28, the apertures 17 and 19 are generally aligned and allows a predetermined interlocking geometry, indicated generally at 18, adapted for joining the reinforcements. A predetermined plastic overmold 20 flows through the apertures 17,19, within the interlocking geometry portion 18 and over the geometric features 16. This sandwiches the reinforcements together forming the joint. Plastic, e.g., polypropylene, is delivered to join the reinforcements. By way of example, the plastic forms a panel 21 that abuts against a bottom surface 23 of the at least one reinforcement 12. The plastic also fills the interlocking geometry portion 18, including abutting against at least one bottom surface 25 of the 3D reinforcement 14. The plastic also at least partly overmolds 20 the geometric features 16. Thus, a strong reinforcement joint is formed without the need for welding. FIGS. 1-2 depict one interlocking geometry region. It is understood that more or less overmolded connection portions 27 are contemplated depending on the application without departure from the scope of the present invention.

The reinforcement 12 is preferably metal, e.g., aluminum, steel, etc. The 3D reinforcement 14 and geometric feature 16 are preferably metal, e.g., aluminum, steel, etc. The reinforcement 12 is preferably steel and the geometric feature 14 and bracket 16 are preferably aluminum.

Figure 3:
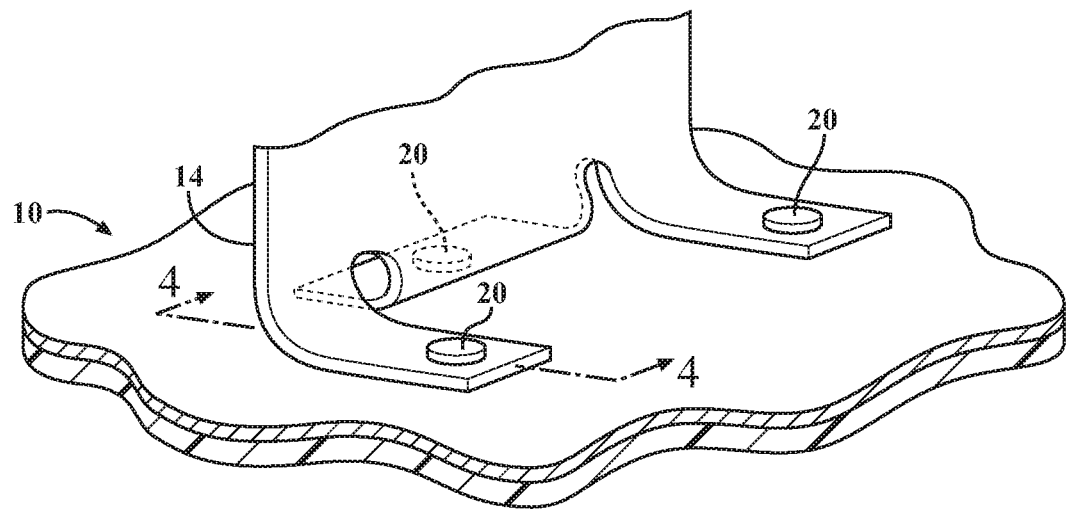
FIG. 3 is a perspective view of a joint formed by interlocking metal parts with an overmold, in accordance with the present invention.
Figure 4:
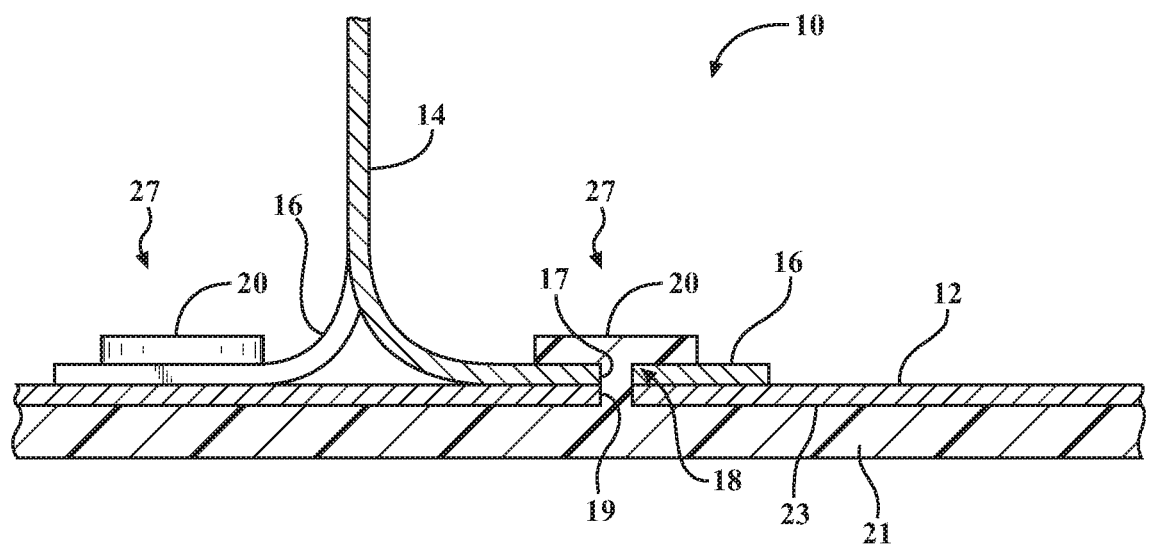
FIG. 4 is a cross sectional view taken at 4-4 of FIG. 3, according to aspects of the present invention.

Referring more particularly to FIGS. 3-4, there is depicted a metal overmolding joint shown generally at 10 including at least one reinforcement 12, and including at least one 3D reinforcement 14 including at least one geometric feature 16 (e.g., at least two flanges 16, at least two legs, a plurality of opposite facing legs, at least two flanges facing one direction and at least one additional flange generally facing an opposite direction, ribs, etc). FIGS. 3-4 depict three exemplary geometric features 14 that extend in opposite directions on lower portions of the reinforcement 16 (two in one direction, and the other in a second direction). Another aperture 19 is formed in the at least one reinforcement 12. The at least one 3D reinforcement is typically a bracket including the at least one geometric feature 16 adjacent an aperture 17 formed in the 3D reinforcement 14. Another aperture 19 is formed in the at least one reinforcement 12. When the at least one reinforcement 12 and the at least one 3D reinforcement 14 are then positioned relative to each other for creating the desired joint, the apertures 17 and 19 are generally aligned and allows a predetermined interlocking geometry, indicated generally at 18, adapted for joining the reinforcements. A predetermined plastic overmold 20 flows through the apertures 17,19, within the interlocking geometry portion 18 and over the geometric features 14. This sandwiches the reinforcements together forming the joint. Plastic, e.g., polypropylene, is delivered to join the reinforcements. By way of example, the plastic forms the panel 21 that abuts against a bottom surface 23 of the at least one reinforcement 12. The plastic also fills the interlocking geometry portion 18, including both apertures 17 and 19. The plastic also at least partly overmolds 20 the geometric features 16. Thus, a strong reinforcement joint is formed without the need for welding. FIG. 3 depicts three interlocking geometry regions. It is understood that more or less overmolded interlocking interlocking connections 27 are contemplated depending on the application without departure from the scope of the present invention.

Figure 5:
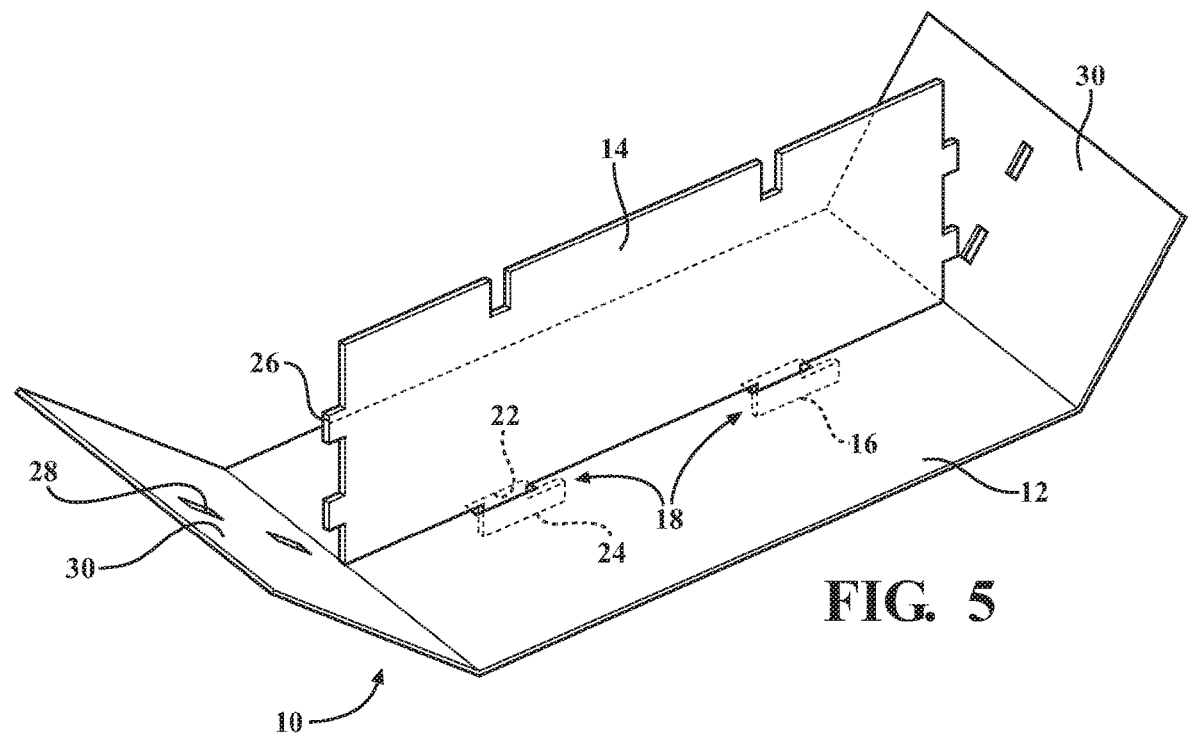
FIG. 5 is a perspective view of a joint formed by interlocking metal parts with an overmold, in accordance with the present invention.
Figure 6:
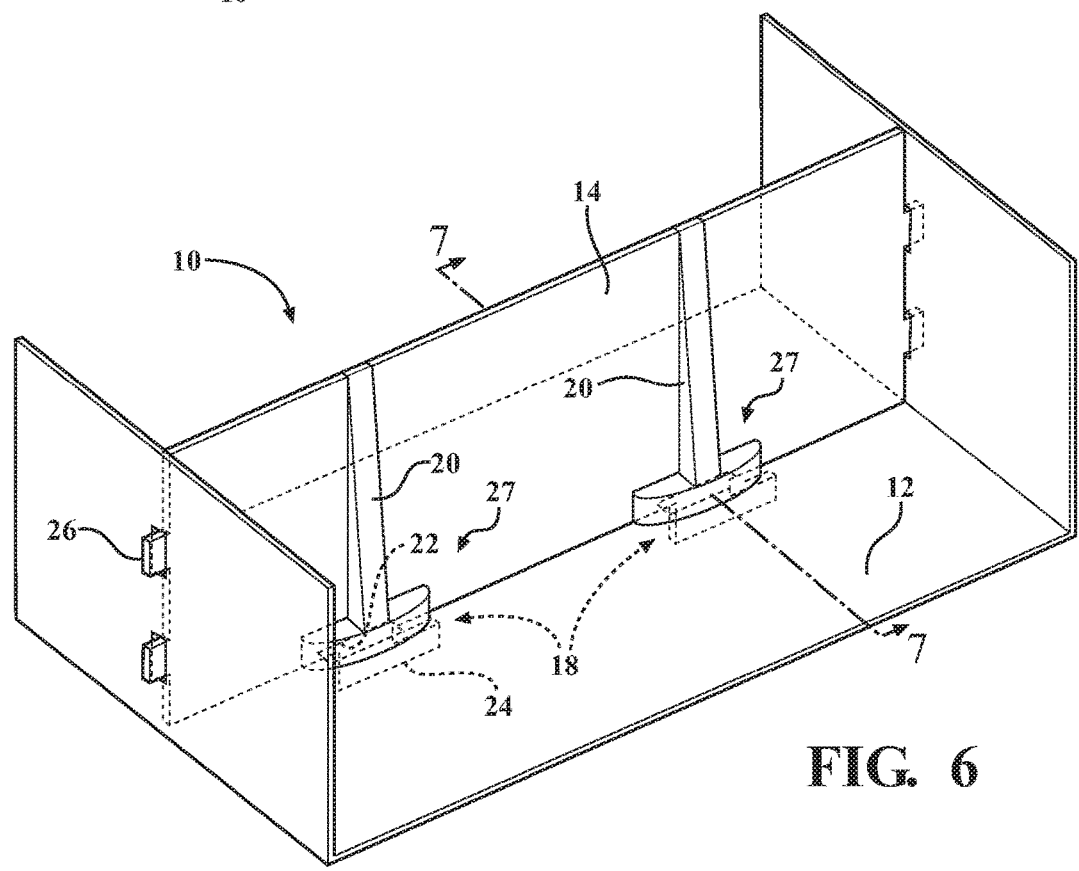
FIG. 6 is a cross sectional view of FIG. 5, according to aspects of the present invention.
Figure 7:
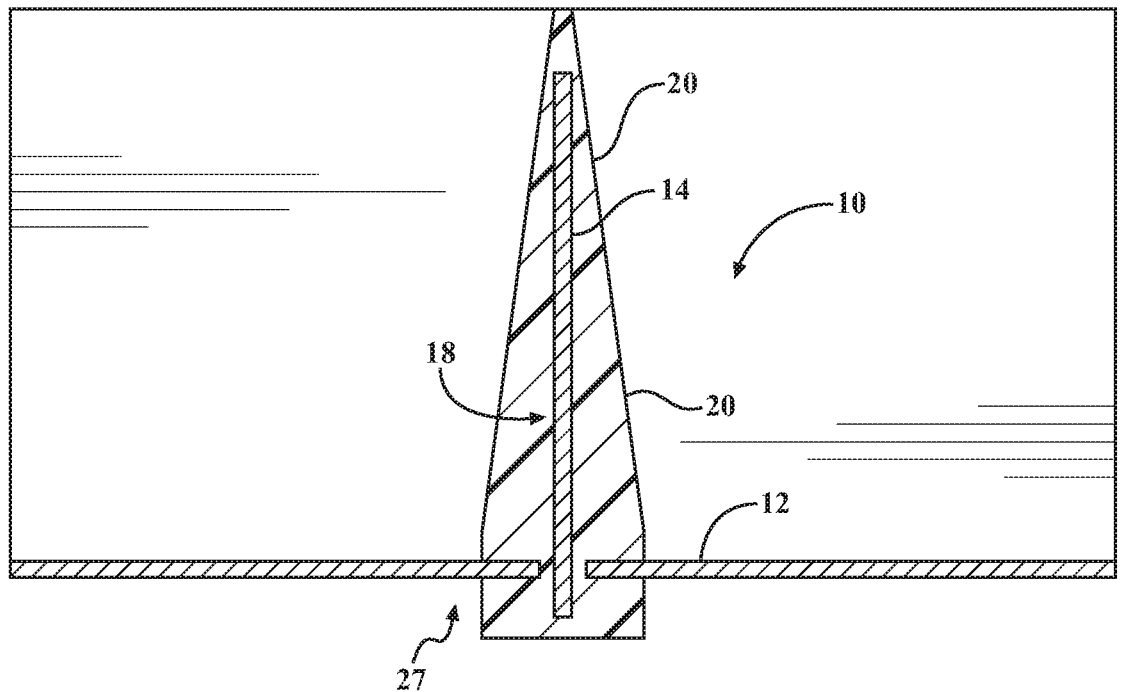
FIG. 7 is a cross sectional view taken at 7-7 of FIG. 6.

Referring more particularly to FIGS. 5-7, there is depicted a metal overmolding joint shown generally at 10 including at least one reinforcement 12 and at least one second reinforcement 14 including at least one geometric feature 16 with predetermined interlocking features that are at least partially overmolded 20. Pre-assembly of the metal reinforcements is done without welding, then is overmolded. The geometric features 16 are preferably tabs that are bent or tabs 24 that are not bent, e.g., slid through slots 22 and into place for mechanical lock. Overmold is performed at least partly about tabs 24 and are interlocked at at least one interlocking portion 18. The at least one reinforcement 12 and/or the second reinforcement 14 has/have at least one slot 22 to receive a corresponding interlocking feature 24 (e.g., tab). The figures depict to tab/slot mechanical interlocks, however, more or less are contemplated depending on the application without departure from the scope of the present invention. Optionally, the second reinforcement 14 can also have additional tabs 26 that fit into apertures 28, e.g., apertures formed on sides 30,30 of the reinforcement 12. Any suitable arrangement and combination is contemplated depending on the particular application without departure from the scope of the present invention. The interlocked unit is then overmolded 20. The slots on the base and slots in the cutouts interlock by sliding and/or bending to snap in.

Figure 8:
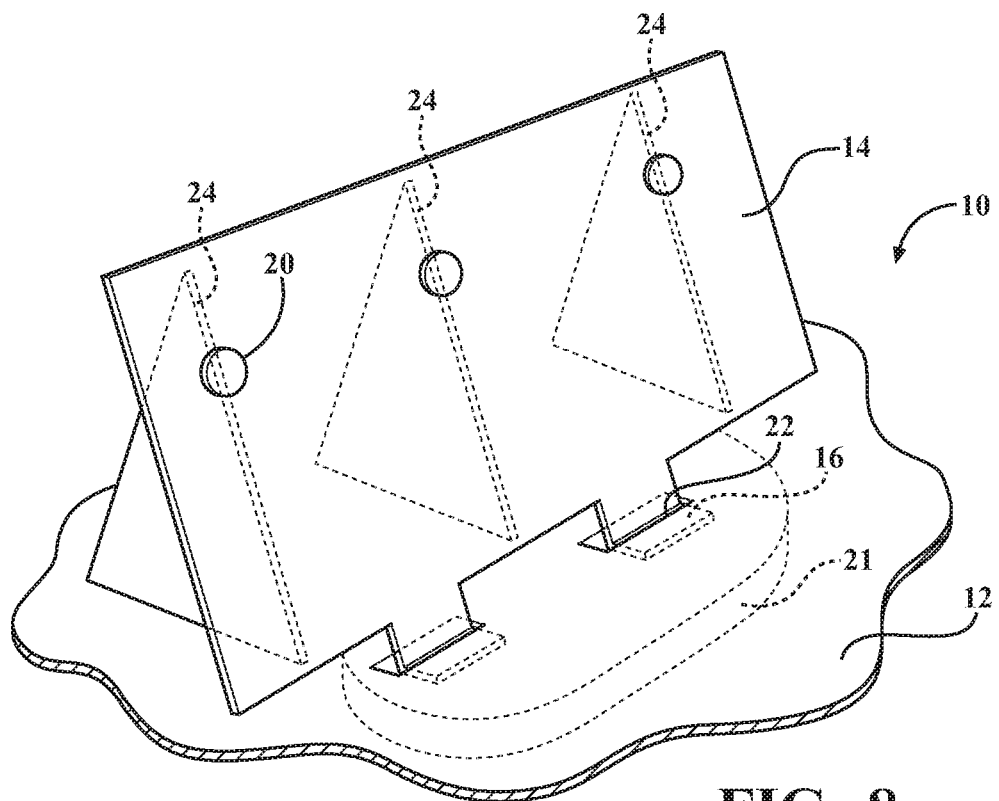
FIG. 8 is a perspective view of a joint formed by interlocking metal parts with an overmold, in accordance with the present invention.

Referring more particularly to FIG. 8, there is depicted a metal overmolding joint assembly shown generally at 10 including at least one reinforcement 12, and at least one second reinforcement 14 with predetermined geometric features 16 for interlocking with the reinforcement 12, e.g., at least one slot/tab 22/16 arrangement formed by the reinforcements. The geometric feature 16 is slid in place and bent or not bent, by way of example. Once the reinforcements 12/14 are interlocked, plastic is delivered and at least partially overmolds 20 the part. Preferably, at least one rib 24 is created with the overmold plastic, e.g., polypropylene, as well as a panel 21 positioned to abut against the bottom surface of the at least one reinforcement 12. The ribs 24 are perform as a fixed position of reinforcement. Apertures can be provided in the metal reinforcement 14 adjacent the ribs 24 to at least partially overmold 20 the plastic against the second reinforcement 14. Most preferably, the slot/tab 22/16 are interlocking metal to metal.

Figure 9:
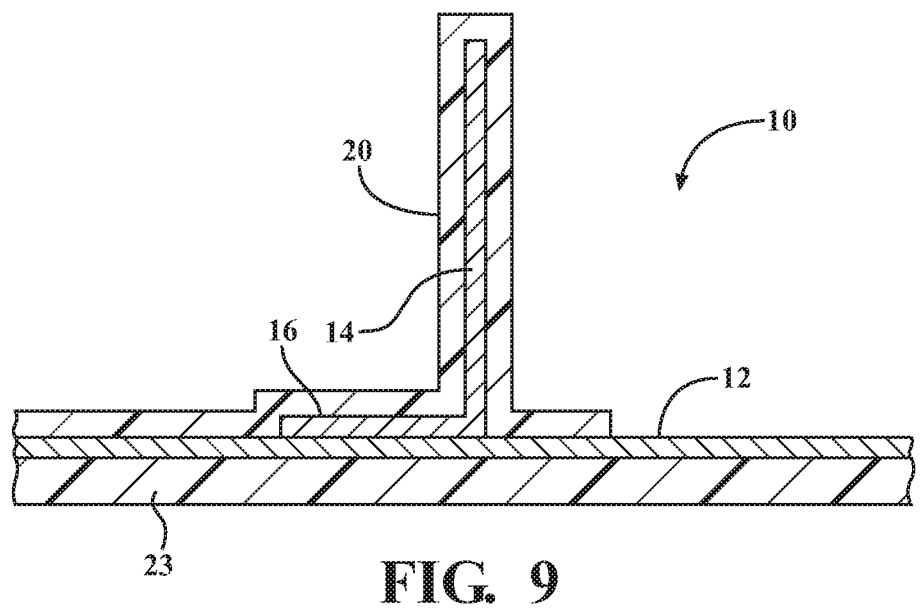
FIG. 9 is a perspective view of a joint formed by interlocking metal parts with an overmold, in accordance with the present invention.

Referring more particularly to FIG. 9, there is depicted a metal rib overmolding joint shown generally at 10 including at least one reinforcement 12 with at least one 3D reinforcement 14 with at least one geometric feature 16. The at least one second reinforcement is at least partially overmolded 20. The reinforcement 12 preferably is against at least one surface of a panel 23 formed of plastic, e.g., polypropylene. The reinforcements are preferably metal, e.g., steel, aluminum, different metal, same metal, etc. FIG. 9 incorporates L-rib overmolds.

Figure 10:
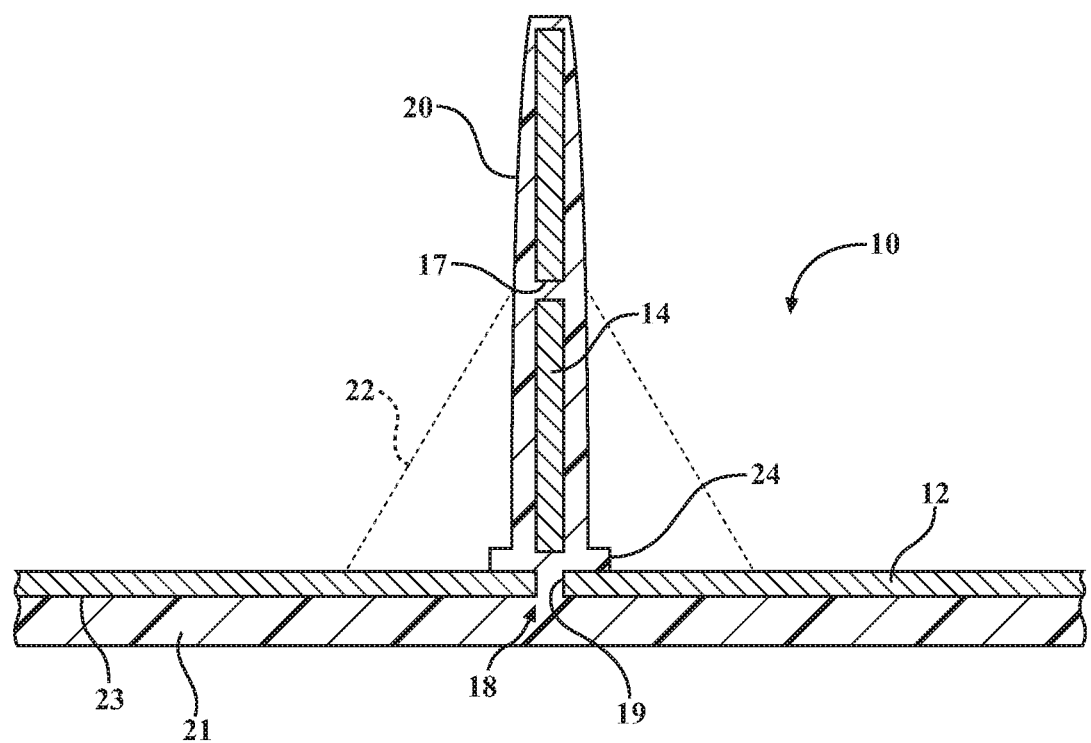
FIG. 10 is a perspective view of a joint formed by interlocking metal parts with an overmold, in accordance with the present invention.

Referring more particularly to FIG. 10, there is depicted a metal rib overmolding joint shown generally at 10 including at least one reinforcement 12 with at least one other reinforcement 14, preferably at least two reinforcements that are spaced apart 14,16 or a single piece 14 that has at least one aperture 17 punched through. The part is overmolded 20. Molded ribs 22 can be formed at time of overmold. Molded supports 24 can be formed at time of overmold. At least one second aperture 19 is formed in the reinforcement 12, preferably, generally in line with the second reinforcement 14. When the reinforcements 12 and 14 are positioned relative to each other for creating the desired joint, the aperture 19 and reinforcement 14 are generally aligned and allows a predetermined interlocking geometry, indicated generally at 18, adapted for joining the reinforcements. Plastic, e.g., polypropylene, is delivered to join the reinforcements. By way of example, the plastic forms a panel 21 that abuts against a bottom surface 23 of the at least one reinforcement 12, and the plastic overmold 20 flows through the aperture 19, within the interlocking geometry portion 18, and at least partially over the geometric features of the reinforcement 14—securing the reinforcements 12,14 in place. Thus, a strong reinforcement joint is formed without the need for welding. FIG. 10 depicts one interlocking geometry region. It is understood that more or less overmolded connections are contemplated depending on the application without departure from the scope of the present invention.

Figure 11:
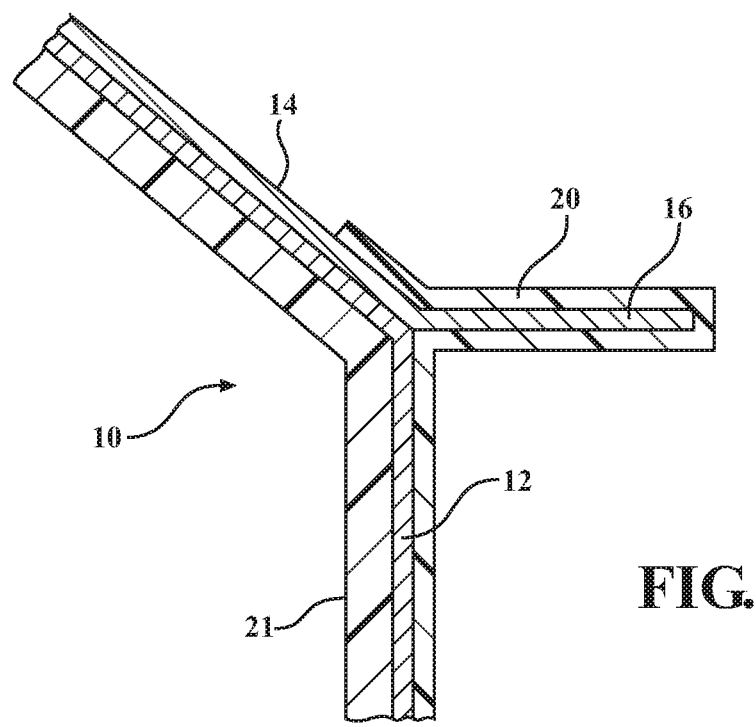
FIG. 11 is a perspective view of a joint formed by interlocking metal parts with an overmold, in accordance with the present invention.

Referring more particularly to FIG. 11, there is depicted a metal rib overmolding joint shown generally at 10 including at least one reinforcement 12, and including at least one second reinforcement 14 with at least one geometric feature 16. Plastic forms a panel 21 portion, e.g., polypropylene. The part is overmolded 20. The reinforcements 12,14 are preferably both steel, aluminum, etc. An aperture can be added, preferably in the Y-part, to hide any sink mark in the radius/transition of the part. The plastic overmold 20 is located at least partially over the geometric features of the reinforcement 14—securing the reinforcements 12,14 in place. Thus, a strong reinforcement joint is formed without the need for welding. FIG. 11 depicts one interlocking geometry region. It is understood that more or less overmolded connections are contemplated depending on the application without departure from the scope of the present invention.

Figure 12:
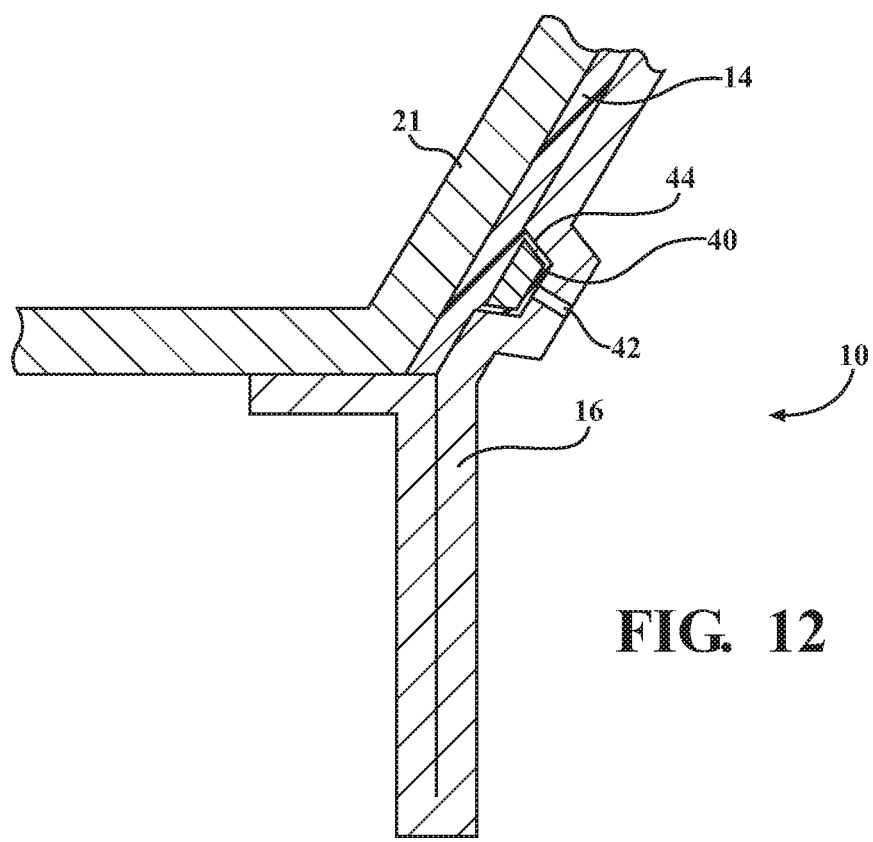
FIG. 12 is a perspective view of a joint formed by interlocking metal parts with an overmold, in accordance with the present invention; and, FIG. 13 is a perspective view of a joint formed by interlocking metal parts with an overmold, in accordance with aspects of the present invention.

FIG. 12 is similar but a mechanical lock is added 40, and an aperture 42 is included to shoot in plastic material, e.g., polypropylene. There is provided the mechanical lock 40 (e.g., not parallel, but a 3D shape) with an air pocket 44 in-between parts for the flow of plastic.

Figure 13:
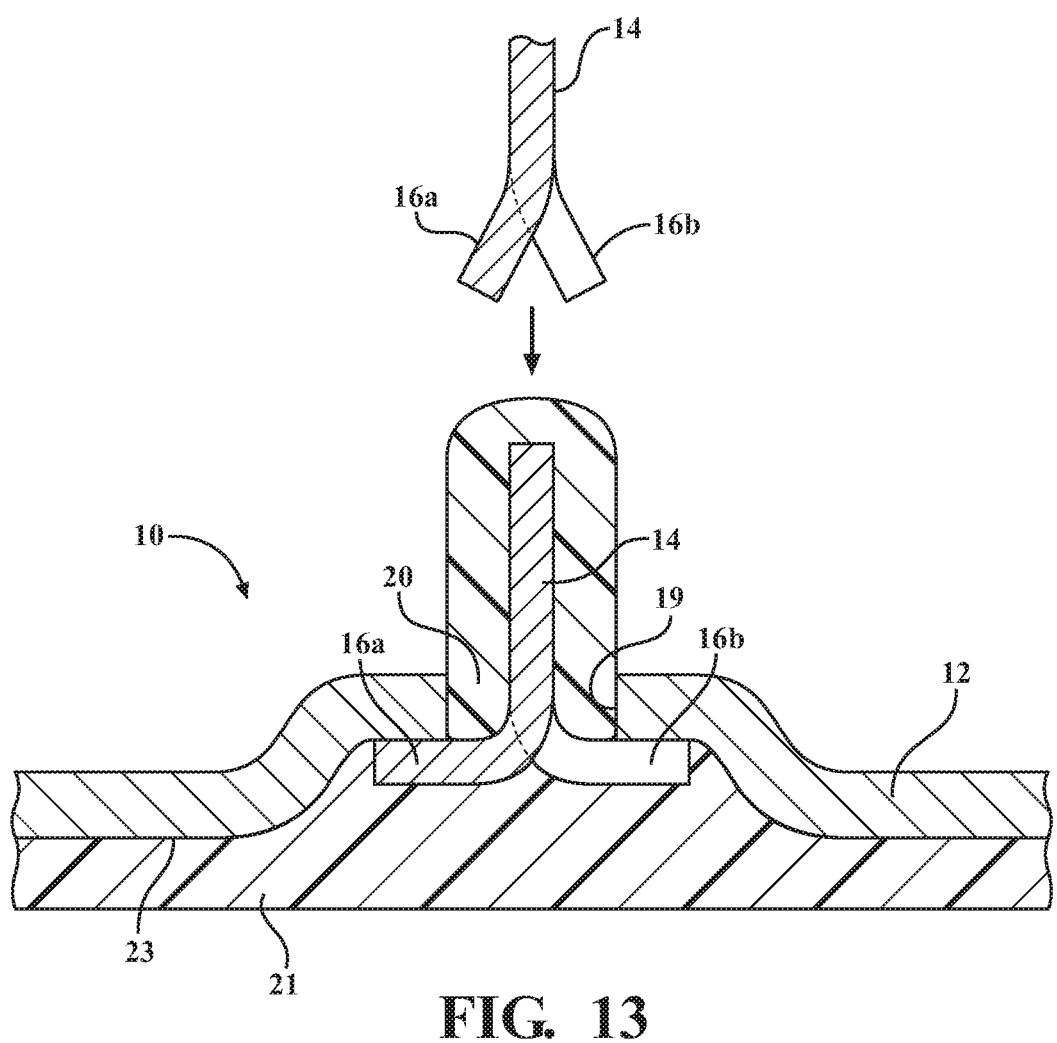

Referring more particularly to FIG. 13, there is depicted a metal rib overmolding joint shown generally at 10 including at least one reinforcement 12, and at least one second reinforcement 14 with geometric features 16a,16b (e.g., at least two flanges 16, at least two legs, a plurality of opposite facing legs, at least two flanges facing one direction and at least one additional flange generally facing an opposite direction, ribs, etc). At least one aperture 19 is formed in the at least one reinforcement 12, and the second reinforcement's 14 legs 16a,16b are pushed through the aperture 19 and flange out on the other side of the reinforcement 12.

Preferably, there's a Y-shape cut in metal bracket 14, and when it's pushed through the aperture 19, it flanges out and then it becomes fixed with plastic overmold 20. The panel 21 of plastic is against the under surface of the reinforcement 12 and surrounds the legs 16a,16b.

While an inner panel of a liftgate is shown, it is understood that the present invention is applicable to and adaptable to any vehicle panel, especially large panels, such as, but not limited to, door panels, door deck lids, enclosure panels, liftgates, tailgates, windshield panels, window panels, etc and any other panel without departure from the scope of the present invention.

While a hinge reinforcement area is shown, it is understood that the present invention is applicable to and adaptable to any area of a large panel, such as, but not limited to, upper hinge area, strut area, ball joint area, windshield area, window area, license plate area, garnish trim, side trim, ribbing, etc. and any other area or on any other panel and area without departure from the scope of the present invention.

While the plate/ribs are metal, preferably steel, it is understood that alternative materials suitable for meeting predetermined requirements depending on the application are contemplated without departure from the scope of the present invention.

While "rib" is mentioned throughout, it is understood any suitable structure depending on the application is contemplated without departure from the scope of the present invention. While "plate" is mentioned throughout, it is understood any suitable structure depending on the application is contemplated without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A metal rib overmolding joint assembly operable for a liftgate, comprising: at least one first localized reinforcement that is a metal base plate and includes at least one predetermined geometric feature; at least one three-dimensional localized reinforcement that is metal and includes a plurality of geometric features positioned relative to the at least one geometric feature of the at least one first localized reinforcement, the plurality of geometric features operably positioned and secured to said at least one first localized reinforcement operably adapted for creating a reinforcement interlock without a weld, wherein said geometric features include a plurality of interlocking slots and tabs that interlock the first three-dimensional localized reinforcements, wherein the slots are provided on the first reinforcement to form the predetermined geometric feature, the tabs are provided on the three-dimensional reinforcement, the tabs are L-shaped, and the tabs slide through the slots and into place for mechanical lock to interlock the first reinforcement and the three-dimensional reinforcement without bending the tabs; and a three-dimensional overmold forming a joint overmolded connection for transferring load, wherein at least one side of the three-dimensional overmold is a portion of a liftgate panel, wherein said first and second localized reinforcements in combination form a cruciform-like shape encapsulated by said overmold.

2. A metal rib overmolding operably adaptable for a liftgate, comprising: at least one first localized reinforcement that is metal, said at least one first localized reinforcement including at least one predetermined geometric feature; at least one second localized reinforcement including at least one geometric feature operably adapted to join to said at least one first localized reinforcement at a joint without welding; wherein said geometric features include a plurality of interlocking slots and tabs that interlock the first and second localized reinforcements, wherein the slots are provided on the first reinforcement, and the tabs are provided on the second reinforcement, said tabs are L-shaped and inserted through said slots and slid into place and not bent for mechanical lock to interlock the first and second reinforcements; at least a partial overmold of said joint creating an overmolding connection to transfer load forces, wherein said first and second localized reinforcements together form a cruciform-like shape cross section encapsulated by said overmold; at least one panel, wherein at least portions of said first and second localized reinforcements are sandwiched between the panel and the overmold and at least one side of the overmold is a vehicle panel.

3. The metal rib overmolding of claim 2, wherein at least one of said first and second localized reinforcements is an upstanding three-dimensional feature.

4. The metal rib overmolding of claim 2, wherein at least one of said first and second localized reinforcements is a three-dimensional reinforcement including a plurality of ribs.

5. The metal rib overmolding of claim 2, further comprising a plurality of ribs formed of the overmold material in a fixed position for additional reinforcement.

6. The metal rib overmolding of claim 2, further including a plurality of substantially L-shaped rib overmolds engaging the first and second localized reinforcements.

7. The metal rib overmolding of claim 2, wherein the first and second localized reinforcements are metal, interlocking metal to metal.

8. The metal rib overmolding of claim 2, wherein at least one reinforcement interlock includes delivered plastic material to at least an interlocking geometry portion providing a joint and overmolding the joint.

9. The metal rib overmolding of claim 2, further comprising additional interlocking apertures/tabs that interlock the first and second localized reinforcements.

10. The metal rib overmolding of claim 9, wherein the interlocking geometry at said joint is overmolded by polypropylene.

11. The metal rib overmolding of claim 2, wherein plastic flows between the first localized reinforcement and second localized reinforcement in predetermined locations via at least one bleeder hole to deliver plastic to the predetermined locations.

12. The metal rib overmolding of claim 11, wherein the plastic is over the at least one geometric feature and within a raised rib channel within a three-dimensional structure.

13. A method of manufacturing a metal reinforcement joint operable for a liftgate, comprising: providing an injection molding tool; providing at least one first localized reinforcement with predetermined geometric features; providing at least one second localized reinforcement with predetermined geometric features operable to secure said at least one first and second localized reinforcements together; positioning said at least one first and second localized reinforcements relative to each other; wherein said geometric features include a plurality of interlocking slots and tabs that interlock the first and second localized reinforcements, wherein the slots are provided on the first reinforcement, and the tabs are provided on the second reinforcement to form the geometric feature; joining said at least one first and second localized reinforcements forming at least one joint portion, wherein the tabs are L-shaped and inserted through the slots and slid into place for mechanical lock to interlock the first and second reinforcements without bending the tabs, wherein when joined, a first portion of said second localized reinforcement contacts said first localized reinforcement on a first plane and a second portion of said second localized reinforcement extends from said first portion on a second plane and angle oblique to said first plane; overmolding at least said at least one joint portion creating a load transferring overmolding connection, wherein said first and second localized reinforcements in combination form a cruciform-like shape cross section encapsulated by said overmold, and wherein at least one side of the overmolding forms a portion of a liftgate panel.

14. The method of claim 13, wherein one of the at least one first and second localized reinforcements is at least one three-dimensional metal rib, and the other one of said at least one first and second localized reinforcements is a metal base plate.

15. The method of claim 13, further comprising slotting said at least one first localized reinforcement to join the first and second localized reinforcements.

16. The method of claim 13, wherein joining further comprises pre-assembling the interlocking parts joint or assembling in the injection molding tool.

17. The method of claim 13, wherein said joining of said at least one first and second localized reinforcement is done by interconnecting the respective first and second localized reinforcements together forming a joint to be overmolded in the injection molding tool.

18. The method of claim 13, wherein said joining of said at least one first and second localized reinforcement is pre-formed and then placed in the injection molded tool.

19. The method of claim 13, wherein the at least one first and localized second reinforcements are steel or aluminum.

20. The method of claim 13, wherein overmolding is three dimensional overmolding of at least the joint that is mechanically securing the at least one first and second localized reinforcements together.

21. The method of claim 13, wherein the at least one first and second localized reinforcements create joints without welding.

22. The metal rib overmolding claim 13, wherein the reinforcement interlock is pre-assembled outside of an injection molding tool, interlocking the first and second localized reinforcements without welding.

23. The metal rib overmolding claim 13, wherein the reinforcement interlock is assembled in an injection molding tool before overmolding and without metal welding.

24. The metal rib overmolding claim 13, further comprising providing an injection tool with active support features.

25. The metal rib overmolding claim 13, further comprising providing an injection tool with a lifter injector pin selectively cycling in/out.

* * * * *